(12) United States Patent
Dreyer et al.

(10) Patent No.: US 12,179,540 B2
(45) Date of Patent: Dec. 31, 2024

(54) AIR VALVE ASSEMBLY HOUSING

(71) Applicant: ZF CV Systems Europe BV, Brussels (BE)

(72) Inventors: Werner Dreyer, Garbsen (DE); Pawel Wysocki, Wroclaw (PL); Wojciech Zabieglo, Wroclaw (PL); Przemyslaw Zak, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 18/428,536

(22) Filed: Jan. 31, 2024

(65) Prior Publication Data

US 2024/0253417 A1 Aug. 1, 2024

(30) Foreign Application Priority Data

Jan. 31, 2023 (EP) .................................... 23154287

(51) Int. Cl.
*B60G 17/052* (2006.01)
*B60G 17/015* (2006.01)

(52) U.S. Cl.
CPC ..... *B60G 17/0523* (2013.01); *B60G 17/0155* (2013.01); *B60G 17/0526* (2013.01); *B60G 2202/152* (2013.01)

(58) Field of Classification Search
CPC ............ B60G 17/0523; B60G 17/0526; B60G 17/052; B60G 17/0525; B60G 17/0528; B60G 17/0155; B60G 17/0152; B60G 17/015; B60G 2202/152; B60G 2500/203; B60G 2500/202; B60G 2500/204; B60G 2500/2041; B60G 2500/2042;
(Continued)

(56) References Cited

U.S. PATENT DOCUMENTS

| 6,007,078 A | 12/1999 | Gottschalk et al. |
| 2019/0030976 A1 | 1/2019 | Bodet et al. |

(Continued)

FOREIGN PATENT DOCUMENTS

| DE | 1 253 537 B | 11/1967 |
| EP | 3 848 211 A1 | 7/2021 |

(Continued)

OTHER PUBLICATIONS

Extended Search Report of the European Patent Office dated Jan. 2, 2024 for European patent application 23154287.9 on which this application is based.

*Primary Examiner* — Keith J Frisby
(74) *Attorney, Agent, or Firm* — Walter Ottesen, P.A.

(57) ABSTRACT

An air valve assembly housing, in particular an air valve assembly, is for an air valve assembly of a commercial vehicle air suspension system. The air valve assembly housing includes an air exhaust chamber and an actuator chamber configured to accommodate a pneumatic actuator. The pneumatic actuator has a valve body that is configured to move between a closed position and an open position. The air valve assembly housing includes a fluid passageway that extends from the actuator chamber to the air exhaust chamber such that the actuator chamber and the air exhaust chamber are in fluid communication at least when the valve body is in the open position. A number of radially extending protrusions partially obstruct the fluid passageway.

18 Claims, 3 Drawing Sheets

(58) Field of Classification Search
CPC .... B60G 2500/2043; B60G 2500/2044; B60G 2500/2046
USPC .................................... 280/124.16, 124.157
See application file for complete search history.

(56) References Cited

U.S. PATENT DOCUMENTS

| | | |
|---|---|---|
| 2021/0206224 A1 | 7/2021 | Repela et al. |
| 2023/0150329 A1* | 5/2023 | Coombs .............. F15B 13/0814 280/124.16 |

FOREIGN PATENT DOCUMENTS

| | | | |
|---|---|---|---|
| JP | 3329507 B2 * | 9/2002 | |
| WO | 2016/026577 A1 | 2/2016 | |

* cited by examiner

A-A

AIR VALVE ASSEMBLY HOUSING

CROSS-REFERENCE TO RELATED APPLICATIONS

This application claims priority of European patent application no. 23154287.9, filed Jan. 31, 2023, the entire content of which is incorporated herein by reference.

TECHNICAL FIELD

The disclosure relates to an air valve assembly housing, in particular an air valve assembly housing for a solenoid valve assembly of a commercial vehicle air suspension system, the air valve assembly housing having an air exhaust chamber, an actuator chamber configured to accommodate a pneumatic actuator, wherein the pneumatic actuator has a valve body that is configured to move between a closed position and an open position.

BACKGROUND

Air valve assemblies of the aforementioned type are generally known in the art. They are for example used for electronically controlled air suspension systems as solenoid valve assemblies, for example used for lift axle control. While these valve assemblies have been generally considered to work reliably, it has been observed in extreme situations, that environmental conditions, such as mud, frozen water and dust may inadvertently enter the air valve assemblies' interior and cause clogging of the air exhaust. This has been shown to cause shortened maintenance intervals and reduce longevity of the air valve assembly.

SUMMARY

It is an object of the disclosure to mitigate the challenges mentioned above as much as possible. In particular, it was an object of the disclosure to provide an improved air valve assembly and air valve assembly housing which has improved longevity and longer maintenance intervals without sacrificing functionality of the assembly.

The disclosure achieves, for example, the object mentioned above by providing an air valve assembly housing. The air valve assembly housing includes: an air exhaust chamber; an actuator chamber configured to accommodate a pneumatic actuator having a valve body configured to move between a closed position and an open position; the air valve assembly housing having a fluid passageway extending from the actuator chamber to the air exhaust chamber such that the actuator chamber and the air exhaust chamber are in fluid communication at least when the valve body is in the open position; and, a number of radially extending protrusions in the fluid passageway partially obstructing the fluid passageway.

According to an embodiment, the air valve assembly housing includes an air exhaust chamber and an actuator chamber configured to accommodate a pneumatic actuator. The pneumatic actuator has a valve body that is configured to move between a closed position and an open position. In particular, it is suggested that the air valve assembly housing includes at least one fluid passageway that extends from the actuator chamber to the exhaust chamber such that the actuator chamber and the exhaust chamber are in fluid communication at least when the valve body is in the open position, wherein a number of radially extending protrusions are disposed in the fluid passageway such as to partially obstruct the fluid passageway. The protrusions are thus realized within the fluid passageway and extend radially with respect to the fluid passageway.

In terms of the disclosure, a number of protrusions is considered to encompass one protrusion or a plurality of protrusions inside the fluid passageway.

The disclosure is based upon the realization that the overall effectiveness of the air valve assembly is not hindered by introducing a flow obstruction into the fluid passageway between the actuator chamber and the exhaust chamber. On the contrary, it has been found that the radially extending protrusions inside the fluid passageway have several advantages over prior art configurations.

Firstly, the number of protrusions, each causing a partial obstruction inside the fluid passageway, causes a deceleration of air travelling through the fluid passageway.

Also, the number of protrusions acts as a deterrent, that is, a barrier, for dirt, dust and liquid, similar in principle to a labyrinth seal. In other words, the number of protrusions makes it harder for any unwanted solid or liquid matter to completely traverse the fluid passageway, thus improving air quality in the exhaust chamber and longevity of any connected parts such as, for example, a silencer assembly.

In an embodiment, the number of protrusions is configured to divert air flowing through the fluid passageway. By doing so, the number of protrusions is effective to prolong the actual flow path of air inside the fluid passageway and thus to improve the aforementioned barrier function against liquid and/or solid-state matter transport.

In a further embodiment, the number of protrusions is formed as one or more threads of a screw, wherein the screw is threaded into the fluid passageway. The screw is in particular configured to force the air into a helical flow path along at least parts of the circumference of the fluid passageway. Essentially, the screw makes it very difficult for liquids and/or dirt particles to completely traverse the fluid passageway. Rather, the unwanted matter is held back by the screw thread, while air may flow past the potentially accumulating liquid and/or particles along the helical flow path towards the exhaust chamber.

In a further embodiment, the air valve assembly housing has a housing exterior and the fluid passageway includes a first orifice facing the air exhaust chamber and a second orifice facing the housing exterior and the screw is threaded into the second orifice. Forming the fluid passageway as a continuous recess extending from the first orifice though to the second orifice allows for cost-efficient manufacturing and allows for the valve assembly housing to be made as a cast part, for example from a molded plastic material. In particular, the molded plastic material includes or consists of a polyphthalamide material.

By using a screw to provide the partial obstruction of the fluid passageway, the dirt seal function can be achieved with a very easy mounting procedure in a time-efficient and cost-efficient manner, while at the same time also closing the second orifice reliably.

In a further embodiment, the screw includes a screw head, wherein the screw head covers the second orifice.

It has been found that it is not necessary to hermetically seal the second orifice in a fluid-tight and pressure-tight manner. Instead, it has been found sufficient to have the screw head abut against an end face of the fluid passageway on the second orifice. However, in a further embodiment a washer is sealingly disposed between the second orifice and the screw head to further minimize the risk of inadvertent ingress of dirt, liquid et cetera.

Since the air exiting the actuator chamber is meant to be released to the environment via the exhaust chamber anyway, it has been found to be sufficient if the screw head merely prevents major leakage, that is, if the majority of air exiting the actuator chamber flows through the fluid passageway towards the exhaust chamber.

In a further embodiment, the fluid passageway includes an inner wall portion, wherein the screw—with its thread acting as the number of protrusions—engages the inner wall portion by cutting into it, and wherein the fluid passageway includes a lateral channel recessed into the inner wall portion, wherein the fluid passageway includes a clearance between the screw, in particular its thread, and the lateral channel. By recessing a lateral channel into the fluid passageway that defines the clearance between the screw thread and the inner wall portion, the cross section for air flow is somewhat increased to achieve a better compromise between dirt and liquid barrier on the one hand side and sufficient air flow on the other hand side.

In particular, the fluid passageway extends rectilinearly from the actuator through to the exhaust chamber, along a longitudinal axis and the lateral channel in particular runs parallel to the longitudinal axis of the fluid passageway.

In a further embodiment, the air valve assembly housing is configured to be mounted to a vehicle structure in a predetermined orientation, and the fluid passageway includes a horizontally upper half and a horizontally lower half when in the predetermined orientation. In particular, the lateral channel is located in the horizontally upper half when in the predetermined orientation.

The predetermined orientation shall be understood to mean that the valve assembly housing is configured to be mounted in a certain inclination and position on a commercial vehicle, having a certain predetermined angular orientation with respect to gravity when the vehicle is positioned on a horizontal plane.

The horizontally upper half of the fluid passageway faces away from gravity, that is, away from ground level, and the horizontally lower half faces towards gravity, that is, towards ground level.

Caused by gravity, liquid and solid-state matter will accumulate inside the fluid passageway in the horizontally lower half.

By positioning the lateral channel in the horizontally upper half in the predetermined orientation, air flow can occur through the fluid passageway with reduced interference of any potential gatherings of unwanted matter in the lower half. In this way, the number of protrusions, in particular in the shape of one or more screw threads, can optimally carry out the function of being a barrier for particles and liquids, while at the same time air can flow past that material in the upper half of the fluid passageway.

In other words, with reference to an analog clock face, the horizontally upper half of the fluid passageway would be defined between the nine o'clock position, through the noon position to the three o'clock position. The lateral channel being in the horizontally upper half in these terms means that the lateral channel is positioned somewhere between the nine o'clock position and the three o'clock position, such as, for example, in the two o'clock position.

In a further embodiment, the air valve assembly housing includes a silencer housing of a silencer assembly that is associated with, in particular mounted to, the exhaust chamber. The positive effects and benefits of the inventive air valve assembly housing come into effect particularly when used upstream of the aforementioned silencer housing, the lifespan of which greatly benefits from being kept free of dirt and liquid to a higher degree.

In a further embodiment, the screw which is used for closing the second orifice is a self-tapping screw.

The self-tapping screw can immediately be threaded into the fluid passageway. Using a self-tapping screw does therefore not require cutting a corresponding thread into the fluid passageway beforehand, thus expediting the mounting procedure.

Self-tapping screws are readily available, cost efficient and easy to use for mounting personnel, be it in manual or (partly) automated fashion.

In a further embodiment, the air valve assembly housing includes a base body made of cast material. In particular, the cast material is a plastic material.

The disclosure has hereinabove been described in a first aspect with respect to an air valve assembly housing. In a second aspect, the disclosure further relates to an air valve assembly of a commercial vehicle air suspension system, in particular a solenoid valve assembly.

The disclosure achieves the object mentioned initially according to this aspect in that the air valve assembly includes an air valve assembly housing according to one of the embodiments described hereinabove, and at least one pneumatic actuator accommodated in the air valve assembly housing.

In particular, the air valve assembly includes a plurality of pneumatic actuators accommodated in the air valve assembly housing, meaning that the air valve assembly housing of the first aspect in particular includes a plurality of actuator chambers, each of which is configured to accommodate one respective pneumatic actuator.

The air valve assembly of the second aspect shares the benefits of the air valve assembly housing of the first aspect. Embodiments of the air valve assembly housing of the first aspect can correspond as applicable to embodiments of the air valve assembly of the second aspect and vice versa, which is why reference is made to the description hereinabove to avoid unnecessary repetition.

In a further aspect, the disclosure also relates to a commercial vehicle having an air suspension system, in particular an electronically controlled air suspension system. In this third aspect, the disclosure achieves the object mentioned initially by suggesting that the vehicle includes an air valve assembly according to any one of the embodiments of the second aspect described hereinabove, in other words an air valve assembly housing according to the first aspect of any one of the embodiments described hereinabove.

Again, the benefits of the air valve assembly housing mentioned hereinabove in the first aspect are also benefits of the commercial vehicle of the third aspect. Embodiments of the air valve assembly housing of the first aspect and the air valve assembly of the second aspect can correspond as applicable to embodiments of the commercial vehicle of the third aspect and vice versa, which is why reference is made to the description hereinabove to avoid unnecessary repetition.

In a further aspect, the disclosure also relates to the use of a screw, in particular the use of a self-tapping screw, in an air valve assembly, in particular a solenoid valve assembly of a commercial vehicle air suspension system, to partially obstruct a fluid passageway of the air valve assembly that extends from an actuator chamber of the air valve assembly to an exhaust chamber of the air valve assembly, such that the actuator chamber and the exhaust chamber are in fluid communication at least when a valve body of the air valve assembly is in an open position.

Again, the disclosure according to this aspect makes use of the same benefits as the air valve assembly housing of the first aspect and the other aspects of the disclosure described hereinabove. Embodiments of the first, second and third aspects described hereinabove can also correspond as applicable to embodiments of the use of the fourth aspect and vice versa, which is why, again, reference is made to the description hereinabove to avoid unnecessary repetition.

In some embodiments, the air valve assembly housing for the inventive use is formed according to any one of the embodiments described hereinabove.

BRIEF DESCRIPTION OF DRAWINGS

The invention will now be described with reference to the drawings wherein.

DETAILED DESCRIPTION

Figure 1:
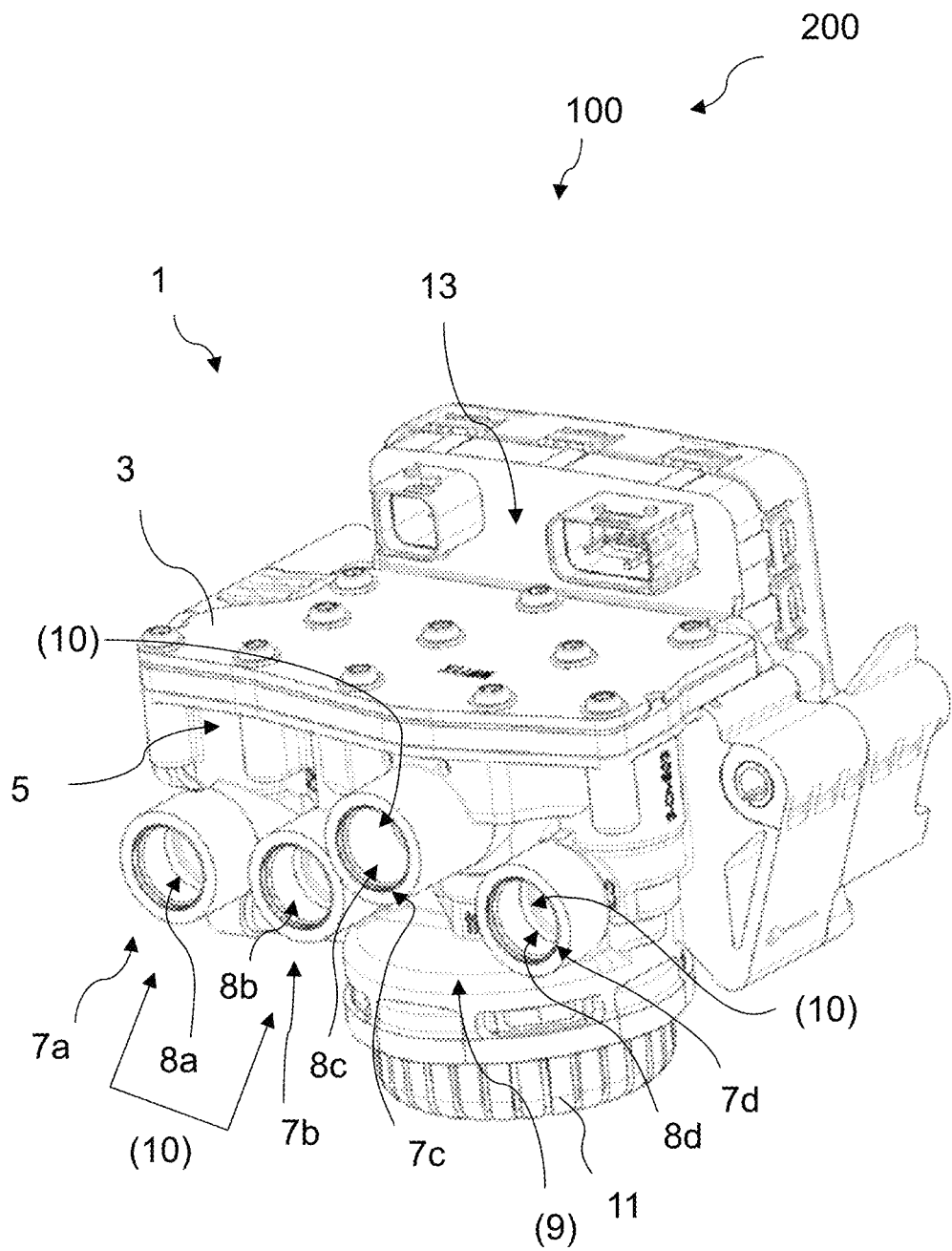
FIG. 1 shows a three-dimensional view of an air valve assembly according to an embodiment of the disclosure.

FIG. 1 depicts an air valve assembly 1 which in the embodiment is a solenoid valve assembly of an air suspension system 100 for a commercial vehicle 200.

The air valve assembly 1 includes an air valve assembly housing 3. The housing 3 includes a base body 5, which may be made of a cast plastic material.

The base body 5 includes a number of actuator chambers, namely a plurality of actuator chambers 7a, 7b, 7c, 7d. The actuator chambers 7a, 7b, 7c, 7d are respectively configured to accommodate a pneumatic actuator 8a, 8b, 8c, 8d having a valve body 10, wherein the valve body 10 is configured to move between a closed position and an open position to control fluid flow through the air valve assembly 1 in generally known fashion.

The air valve assembly 1 further includes an air exhaust chamber 9 connected to a silencer housing 11, the silencer housing 11 being configured to accommodate a silencer assembly (not shown).

Air transported through the air valve assembly 1 by actuation of the pneumatic actuators 8a, 8b, 8c, 8d is guided through the common air exhaust chamber 9 into the silencer housing 11 to dampen noise caused by pressurized air exiting the air valve assembly 1.

The air valve assembly 1 includes a connection interface 13 for coupling power and control means to actuate the pneumatic actuators 8a-8d in generally known fashion.

Rather than employing manifolds and air plenums which would collect pressurized air travelling through the actuator chambers 7a-7d before the air would then be transported towards the exhaust chamber, the disclosure employs direct fluid communication between one, several or all of the actuator chambers 7a, 7b, 7c, 7d and the air exhaust chamber 9, which will be discussed in more detail with reference to FIGS. 2 and 3. For example, as shown in the embodiment this can be provided exclusively for the first actuator chamber 7a.

Figure 2:
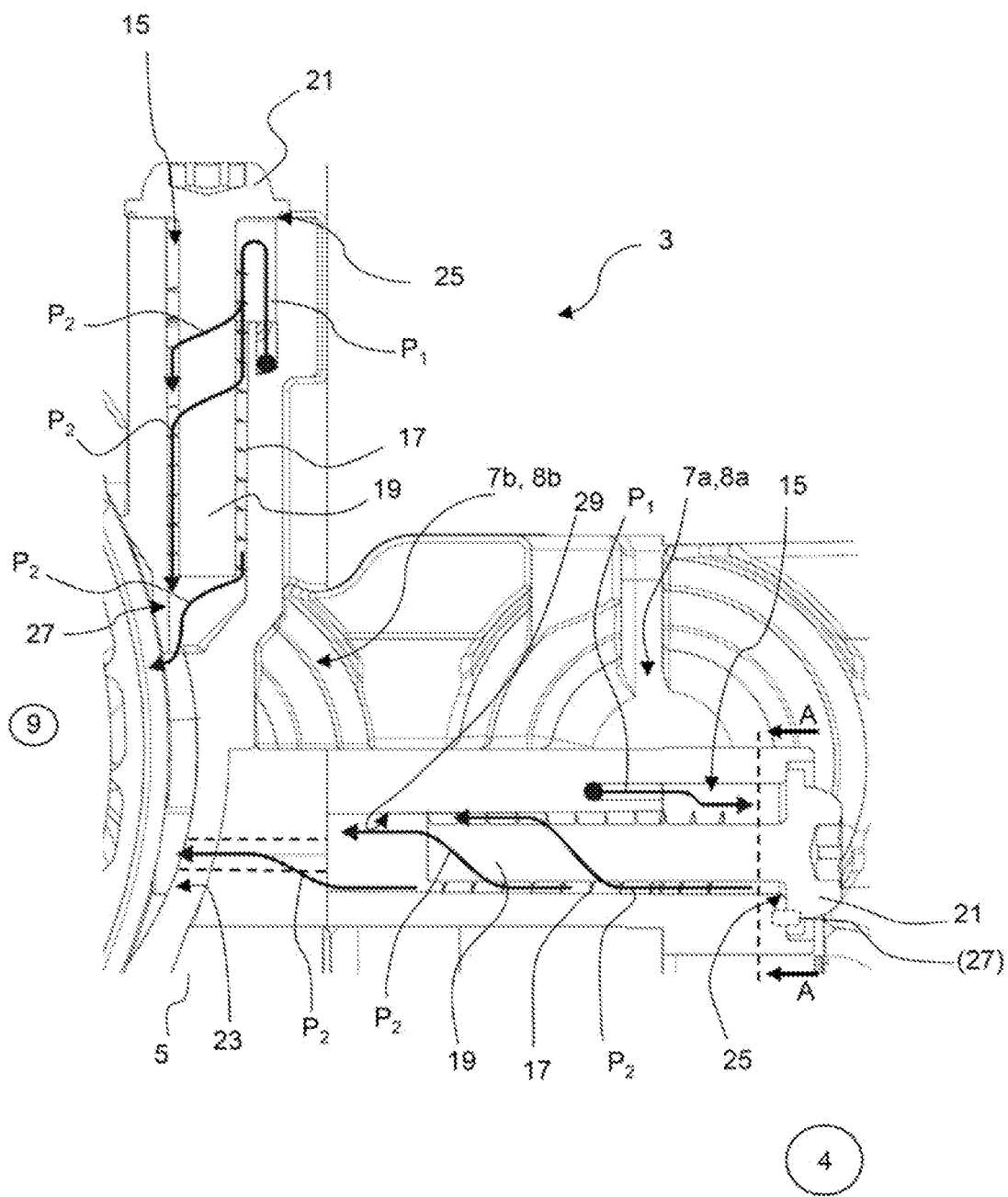
FIG. 2 shows a schematic cross-sectional view of a part of the air valve assembly of FIG. 1; and, FIG. 3 shows a further cross-sectional view of the air valve assembly shown in FIGS. 1 and 2.
Figure 3:
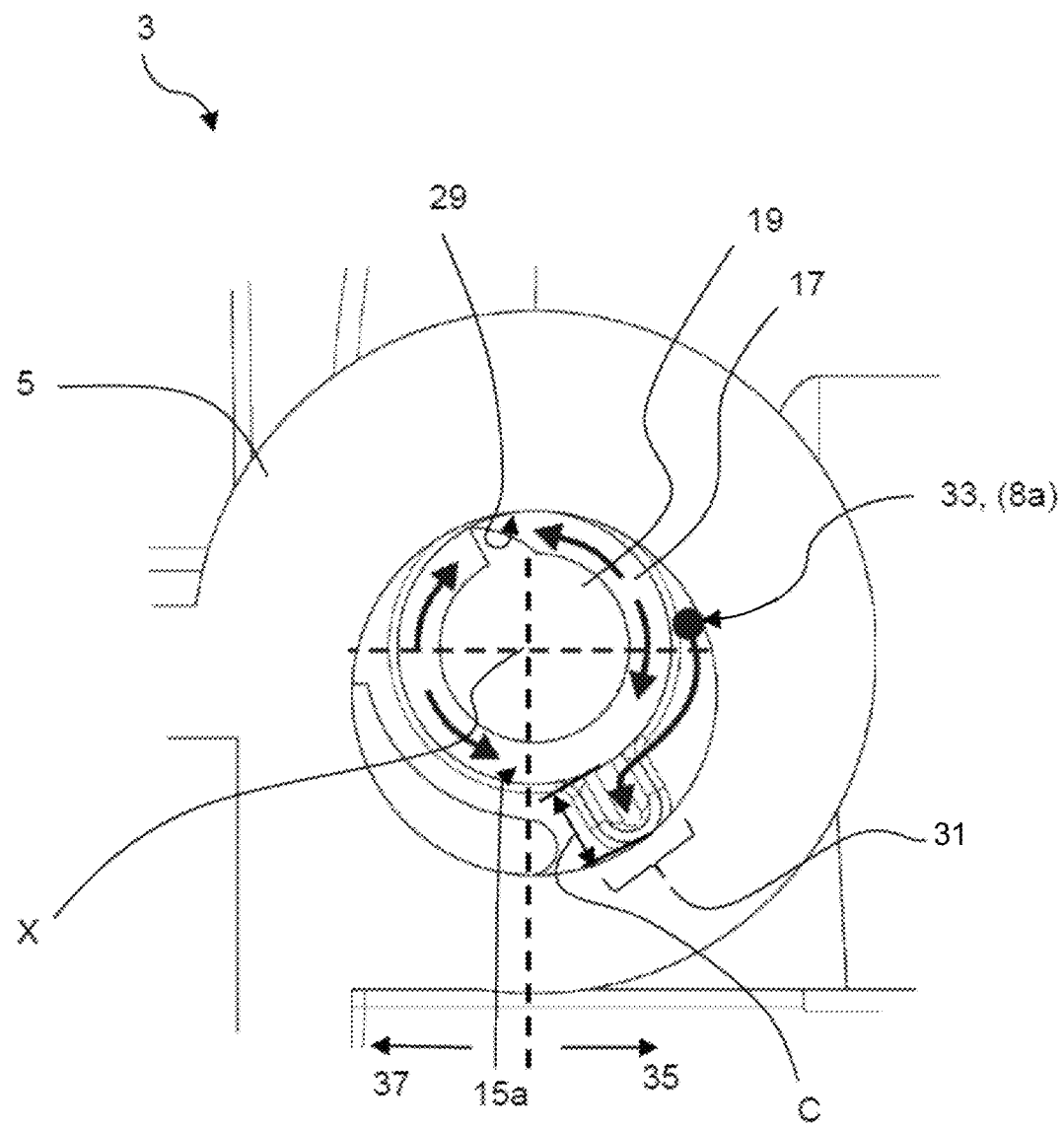

As can be seen in from FIGS. 2 and 3, the air valve assembly housing 3 includes for at least one, and in particular for a plurality or all of the actuator chambers 7a-7d, a fluid passageway 15 which is in direct fluid communication with a respective one of the actuator chambers 7a-7d and with the common air exhaust chamber 9. When the valve body 10 of the respective pneumatic actuator 8a-8d inside the respective actuator chamber 7a-7d is in the open position, pressurized air can flow directly from the actuator chamber 7a-7d into a respective one of the number of fluid passageways 15 and from there towards the air exhaust chamber 9. However, air flow is prevented from streaming unimpeded through the fluid passageway 15 as follows:

In the fluid passageway 15, a number of radial protrusions 17 is provided, which partially obstruct the fluid passageway 15. In the present embodiment, the number of protrusions 17 is formed as a single helical thread formed on a screw 19 which in the present embodiment is a self-tapping screw.

The protrusion 17 is effective to force air that enters the fluid passageway 15 according to arrow P1 from a respective one of the actuator chambers 7a-7d into a helical flow path indicated by arrow P2 along at least part of the fluid passageway 15, before the pressurized air can eventually exit the fluid passageway 15 through a first orifice 23 into the exhaust chamber 9.

The fluid passageway 15 further includes a second orifice 25 opposite the first orifice 23, which opens to a housing exterior 4 of the air valve assembly housing 3 and which is covered by a screw head 21 of the screw 19. Optionally, a washer 27, which might be a sealing washer, may be installed in between the screw head 21 and the second orifice 25.

The protrusion 17 acts as a barrier for liquid and dust particles which might inadvertently enter the flow path that is provided by the fluid passageway 15 between the pneumatic actuator 7a-7d and the exhaust chamber 9.

The protrusion 17 may be a single continuous protrusion extending helically along the screw 19, as shown, but it might also be formed as a plurality of protrusions, for example, as a segmented thread which is interrupted by longitudinal recesses in general known fashion.

The protrusion 17 cuts into an inner wall portion 29 of the fluid passageway 15. By doing so, the screw 19 is at the same time held reliably in place inside the fluid passageway and can withstand the operating pressures that are to be conducted through the air valve assembly 1, and which may be in the range of 10 bar, 12 bar, 15 bar or even higher than that. Also, the cutting engagement of the protrusion 17 with the inner wall portion 29 forms a helical flow path as described hereinabove for the air.

While FIG. 2 shows a cross-sectional view in a plane defined by the axis X of two fluid passageways 15, FIG. 3 shows an orthogonal cross-sectional view in the direction of axis X. FIG. 3 shows the fluid passageway 15 that is connected to the first actuator chamber 7a, but it shall be understood that the setup may be the same also for one, more or all further fluid passageways 15.

The view is a 90° rotation of a predetermined mounting position of the air valve assembly 1. When in the predetermined mounting position, the fluid passageway 15 is virtually separated into a horizontally upper half 35 and a horizontally lower half 37.

The inner wall portion 29 includes a lateral channel 31 that extends in the direction of the longitudinal axis X of the fluid passageway 15. In particular, as shown in FIG. 3, the lateral channel 31 runs parallel to the longitudinal axis X in at least a portion of the fluid passageway 15.

The protrusion 17 engages the inner wall portion 29 to essentially prevent direct axial flow with respect to axis X, but the lateral channel 31 defines a clearance C which remains unobstructed by the protrusion 17. Air can flow unimpeded to the lateral channel 31 even if dirt, that is, solid-state matter and/or liquid did enter the fluid passageway 15, because by virtue of gravity, the unwanted matter would then gather in the horizontally lower half 37 of the fluid passageway.

In the predetermined mounting position of the air valve assembly 1, the lateral channel in its orientation according to FIG. 3 would be in the two o'clock position. Since the lateral channel 31 is located in the horizontally upper half 35 of the fluid passageway 15, for example, in the two o'clock position as shown, air can flow unimpeded and with only minimal risk of dragging along the unwanted matter towards the exhaust chamber 9 (c.f. FIG. 2).

As can be seen from the figures described hereinabove, the disclosure suggests a very efficient and yet cost-efficient way of improving the longevity of the air valve assembly by providing direct fluid communication between the actuator chambers 7a-7d and the exhaust chamber 9 while at the same time reducing ingress of unwanted material into the exhaust chamber by providing the partial obstruction of the fluid passageway 15.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 air valve assembly
3 air valve assembly housing
4 housing exterior
base body
7a, 7b, 7c, 7d actuator chambers
8a, 8b, 8c, 8d pneumatic actuator
9 air exhaust chamber
10 valve body
11 silencer housing, silencer assembly
13 connection interface
15 fluid passageway
17 protrusion
19 screw
21 screw head
23 first orifice
25 second orifice
27 washer
29 inner wall portion
31 lateral channel
35 horizontally upper half
37 horizontally lower half
100 air suspension system
200 vehicle
C clearance
P1 arrow, entry into fluid passageway
P2 arrow, flow through and exit from fluid passageway
X axis, fluid passageway

The invention claimed is:

1. An air valve assembly housing, the air valve assembly housing comprising:
an air exhaust chamber;
an actuator chamber configured to accommodate a pneumatic actuator having a valve body configured to move between a closed position and an open position;
the air valve assembly housing having a fluid passageway extending from said actuator chamber to said air exhaust chamber such that said actuator chamber and said air exhaust chamber are in fluid communication at least when the valve body is in the open position; and,
a number of radially extending protrusions in said fluid passageway partially obstructing said fluid passageway.

2. The air valve assembly housing of claim 1, wherein said number of protrusions is configured to divert air flowing through said fluid passageway.

3. The air valve assembly housing of claim 1, wherein said number of protrusions is formed as one or more threads on a screw; and, said screw is threaded into said fluid passageway.

4. The air valve assembly housing of claim 3, wherein said air valve assembly housing has a housing exterior; said fluid passageway includes a first orifice facing the air exhaust chamber and a second orifice facing said housing exterior; and said screw is threaded into the second orifice.

5. The air valve assembly housing of claim 4, wherein said screw includes a screw head; and, said screw head covers said second orifice.

6. The air valve assembly housing of claim 3, wherein said fluid passageway includes an inner wall portion; said screw is configured to engage said inner wall portion by cutting into said inner wall portion; said fluid passageway includes a lateral channel recessed into said inner wall portion; and, said fluid passageway has a clearance between said screw and said lateral channel.

7. The air valve assembly housing of claim 6, wherein said fluid passageway extends rectilinearly from said actuator chamber through to said exhaust chamber along a longitudinal axis and said lateral channel runs parallel to the longitudinal axis of the fluid passageway.

8. The air valve assembly housing of claim 6, wherein the air valve assembly housing is configured to be mounted to a vehicle structure in a predetermined orientation and said fluid passageway includes a horizontal upper half and a horizontal lower half when in said predetermined orientation; and, said lateral channel is located in said horizontal upper half when in the predetermined orientation.

9. The air valve assembly housing of claim 3, wherein said screw is a self-tapping screw.

10. The air valve assembly housing of claim 1 further comprising a silencer housing of an assembly associated with said exhaust chamber.

11. The air valve assembly housing of claim 1 further comprising a silencer housing of an assembly mounted to said exhaust chamber.

12. The air valve assembly housing of claim 1 further comprising a base body made of cast material.

13. The air valve assembly housing of claim 12, wherein said base body is made of cast plastic material.

14. The air valve assembly housing of claim 1, wherein the air valve assembly housing is for an air valve assembly of a commercial vehicle air suspension system.

15. An air valve assembly of a commercial vehicle air suspension system, the air valve assembly comprising:
at least one pneumatic actuator having a valve body configured to move between a closed position and an open position;
an air valve assembly housing including an air exhaust chamber and an actuator chamber configured to accommodate said at least one pneumatic actuator; said air valve assembly housing having a fluid passageway extending from said actuator chamber to said air exhaust chamber such that said actuator chamber and said air exhaust chamber are in fluid communication at least when said valve body is in said open position; and, said air valve assembly housing having a number of radially extending protrusions in said fluid passageway partially obstructing said fluid passageway.

16. The air valve assembly of claim 15, wherein the air valve assembly is a solenoid valve assembly.

17. A commercial vehicle comprising:
an air suspension system;
an air valve assembly having a pneumatic actuator and an air valve assembly housing;
said pneumatic actuator having a valve body configured to move between a closed position and an open position;
said air valve assembly housing including an air exhaust chamber and an actuator chamber configured to accommodate said pneumatic actuator;
said air valve assembly housing having a fluid passageway extending from said actuator chamber to said air exhaust chamber such that said actuator chamber and said air exhaust chamber are in fluid communication at least when said valve body is in said open position; and,
said air valve assembly housing having a number of radially extending protrusions in said fluid passageway partially obstructing said fluid passageway.

18. The commercial vehicle of claim 17, wherein said air suspension system is an electronically controlled air suspension system.

* * * * *